United States Patent [19]

Björkland

[11] 4,255,380

[45] Mar. 10, 1981

[54] METHOD AND APPARATUS FOR MANUFACTURING SIGNS OR THE LIKE CARRYING INFORMATION WHICH IS DIFFERENT FOR DIFFERENT VIEWING ANGLES

[76] Inventor: Mats E. Björkland, Banérgatan 27, S-115 22 Stockholm, Sweden

[21] Appl. No.: 10,347

[22] Filed: Feb. 8, 1979

[30] Foreign Application Priority Data

Feb. 16, 1978 [SE] Sweden ................................ 7801808

[51] Int. Cl.³ ........................ B29C 17/04; G09F 19/14

[52] U.S. Cl. ...................................... 264/505; 40/453; 264/509; 264/510; 264/132; 425/388

[58] Field of Search ............... 264/505, 509, 510, 132; 40/453, 454; 355/22, 33, 40, 77, 79; 425/388; 428/29

[56] References Cited

U.S. PATENT DOCUMENTS

| | | | |
|---|---|---|---|
| 829,492 | 8/1906 | Spiegel | 40/453 |
| 990,490 | 4/1911 | Miller | 40/453 |
| 2,889,651 | 6/1959 | Baldanza | 264/132 X |
| 3,060,611 | 10/1962 | D'Andrea | 264/509 X |
| 3,061,881 | 11/1962 | Sherno | 425/388 X |
| 3,107,396 | 10/1963 | Fowler, Jr. et al. | 425/388 X |
| 3,406,476 | 10/1968 | Wilcox | 40/430 |
| 3,749,471 | 7/1973 | Mallard | 264/132 X |

FOREIGN PATENT DOCUMENTS 7208845 7/1972 Sweden

OTHER PUBLICATIONS

R. F. McTier, "Distortion Printing and Vacuum Forming of Thermoplastic Sheet", *SPE Journal,* 7-1962, pp. 741-745.

*Primary Examiner*—Jan H. Silbaugh
*Attorney, Agent, or Firm*—Pollock, Vande Sande & Priddy

[57] ABSTRACT

A sign is fabricated which presents different messages depending on the angle of view. The fabricated sign has walls, different sides having parts of different messages. The method of fabrication includes taking at least two images, cutting them into strips of equal width and combining successive strips alternatively from the two images in order to form a third image, which is printed on a plastic sheet. This sheet is laid upon a wave-formed mold surface so that the tops of the waves coincide with the borders between the strips. The plastic sheet is softened and stretch-deformed, e.g., by vacuum deformation, while the borders are held against movement into the form of the waved mold surface.

5 Claims, 4 Drawing Figures

METHOD AND APPARATUS FOR MANUFACTURING SIGNS OR THE LIKE CARRYING INFORMATION WHICH IS DIFFERENT FOR DIFFERENT VIEWING ANGLES

The invention relates to a method and an apparatus for manufacturing signs presenting different information depending on the angle from which they are viewed. Signs and similar articles of this type have been known for at least a century and are sometimes to be found in antique shops. In principle, they are created from strip-like image elements joined parallel to each other so that elements from each image follow in sequence. All the elements forming one image are arranged perpendicular to a definite direction, each image having its particular direction. Since the whole array is formed by folding or the like from a flat starting material, the different image portions conceal each other so that from a given oblique direction, perpendicular to the longitudinal direction of the image elements, only one of the images is visible, while another image is visible from another direction.

It is known to arrange three images in this way, the elements in one of the images being arranged in one and the same plane while the other two have their elements back-to-back in pairs, there being one element from either image in each pair. The first-mentioned image will be visible straight from the front, while the other two images will be visible from respective sides. U.S. Pat. No. 990,490 teaches a method of forming such images.

Signs and the like for which the present invention is more specifically intended preferably consist of two different images, the elements of each image being placed in alternate spaces between successive folds in a pleated sheet, with the pleats at an even pitch and mutually parallel.

These signs and the like have been known for a very long time, and their advantageous properties have been known to a large extent, where it has been a question of creating a certain conspicuous effect. To this there may be added that there is a rather heavily improved visibility, an image being visible even if the sign is observed from a very shallow angle thereto, where a customary flat sign would only act as a mirror.

In spite of the obvious advantages of this known construction, signs of this type have not achieved great popularity. One of the reasons for this would appear to be that the normal method of manuacture has been by folding paper, for example. This folding in itself already involves considerable complication and cost, and the folded product is ill-suited for handling, transport, affixing, etc., unless it is more or less "framed" at the factory.

One object of the invention is to provide signs, posters and the like of the kind mentioned, which do not have the said disadvantages, but are easily transportable, easy to affix and can be delivered ready to use.

A start point for the invention has been to provide a product of the intended kind, having a certain stiffness, rather than a pleated sheet of paper. The product obtained by the method in accordance with the invention has a suitably adjusted form stability, and generally it can be rolled, signiifying obvious advantages. In any case, it is possible to stack the products, so that their volume in batches will be minor.

Summarily expressed, but without the intention of limitation, the invention can be said to be based on printing both images separated into strips on a deformble sheet of plastic, so that alternate with strips having a portion of one image alternate with strips having the other image. The strips have the same width, and two strips together form a registry spacing. The plastic sheet is then compressed, and for a thermoplastic under heat, it is pressed against a mold having a series of parallel ridges at uniform pitch along its surface. The distance between two adjacent ridges coincides with the registry spacing on the plastic sheet. The sheet must be placed very accurately so that each ridge peak on the mold coincides with a boundary between two strip-like elements on the printed image. If manual adjustment is to be avoided, the printing on the sheet must be carefully located against a location mark suitable for later placing the sheet in the mold. A preferred method of obtaining such location is to allow printing to take place when the sheet has been located by two of its rectangular sides. In such a case the mold should be provided with suitable stop means for insertion with location.

After insertion into the mold, the plastic sheet is made formable, preferably by heating, and is brought into registry with the ridges and intermediate valleys of the mold. This is preferably carried out by pumping air out of the valleys, which can be done if the mold is provided with holes adapted for this purpose, said holes being connected to an air pump. It is naturally also possible to perform the molding operation by pressing a suitably formed pad against the plastic sheet as it lies in the mold.

An embodiment of the invention will now be described while referring to the accompanying drawings.

Figure 1:
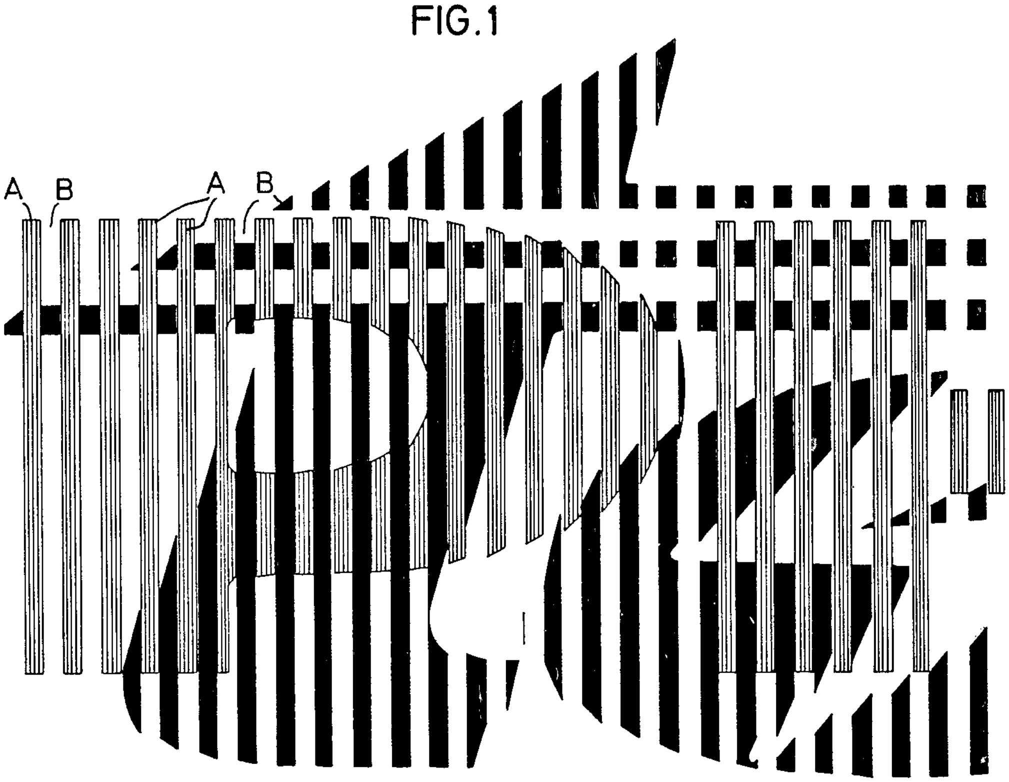
FIG. 1 shows a portion of a printed image consisting of two images. This "double image" is printed on a sheet of plastic.

In applying the invention, one begins with two different images or messages. These can be made in the same or in different colors etc, entirely dependent on the intended result. Manufacture of this image can be schematically conceived as occurring in the following way. Two images A and B are each cut into equally large parallel strips. These strips are then glued to each other using a strip from one image against a strip from the other, as shown in FIG. 1. There is thus obtained an initial image for use in a reproduction process for printing onto a sheet of plastic. (The cutting and gluing mentioned is naturally only a very illustrative way of demonstrating the invention and is not intended to limit it, since those skilled in the graphic art will know that similar or in some cases more practical methods can be employed.)

It has been found suitable for the appearance of the final product to somewhat reduce the width of the images, i.e., to make them short at right angles to the length of the strip. A suitable value for this shortening is 15–25%. Shortening can be done by magnification in an enlarging apparatus, for example, provided with a cylindrical lens.

Silk-screening is a suitable method for printing the images on the plastic sheet, but other methods can also be employed, as long as the necessity for good adhesion of the printing pigment is considered, taking into account that the sheet is to be deformed. According to the preferred embodiment, printing is done so that the sheet is located against a short and a long side thereof. It is further necessary to maintain rather high precision, so that said registry spacing is kept over the whole of the printing surface. No deformation at the outer ends can be permitted, and here consideration must be paid to the production of the image, which is particularly sensitive to the action of distortion in the lens system.

Figure 2:
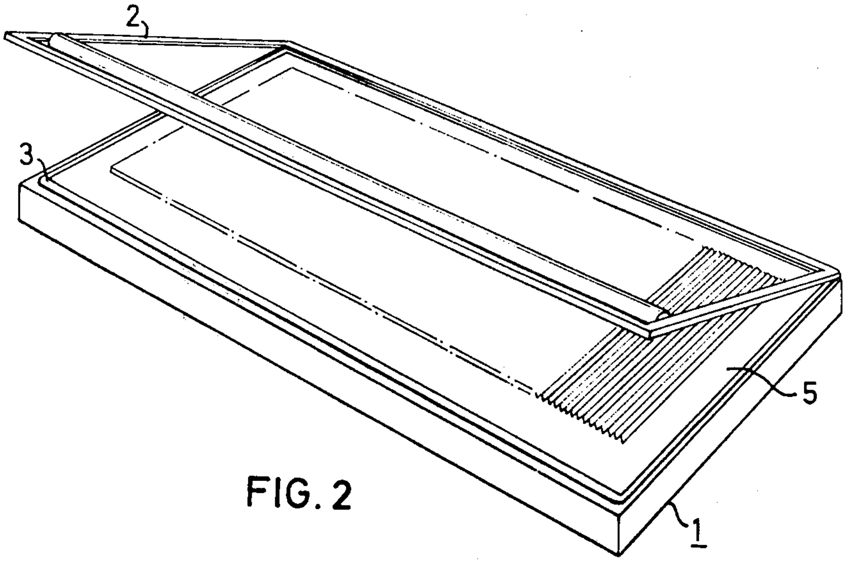
FIG. 2 shows how this "double image" is deformed in accordance with the invention.
Figure 3:
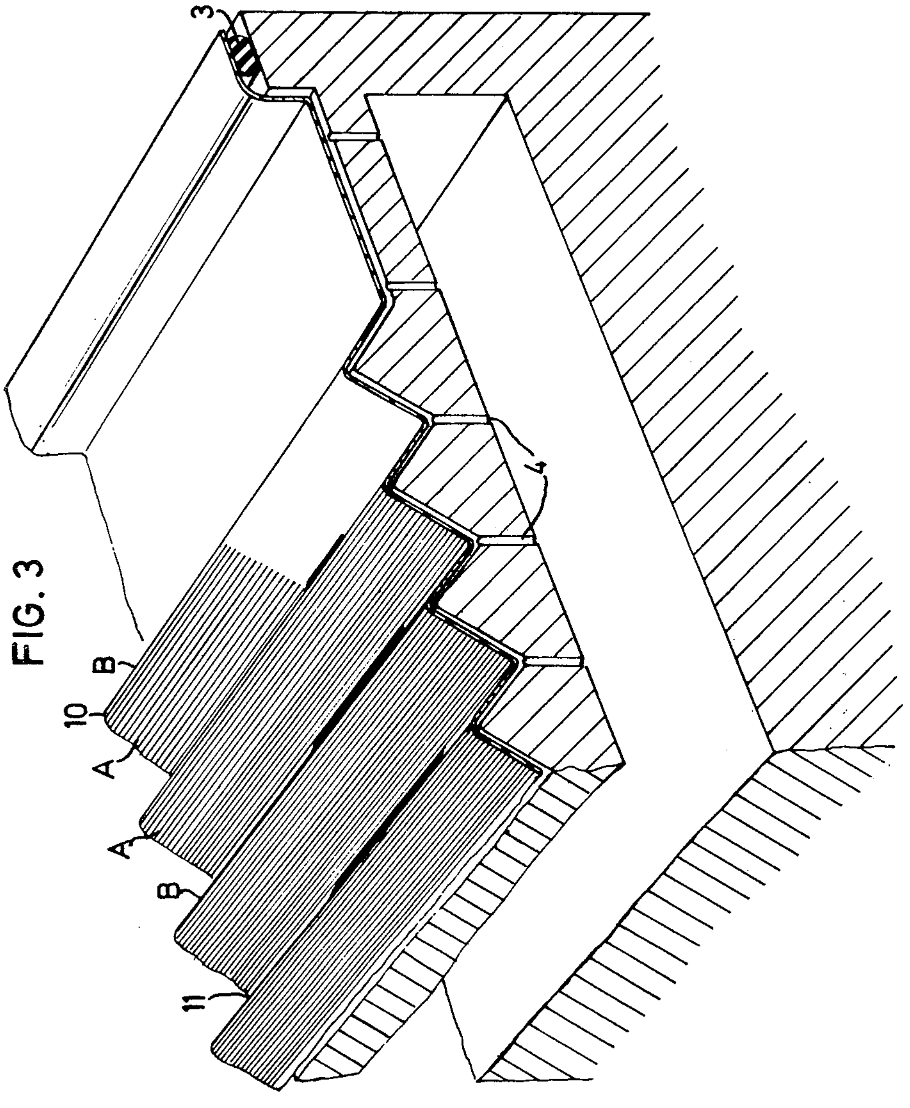
FIG. 3 shows a mold intended for vacuum molding during manufacture in accordance with the inventive method.
Figure 4:
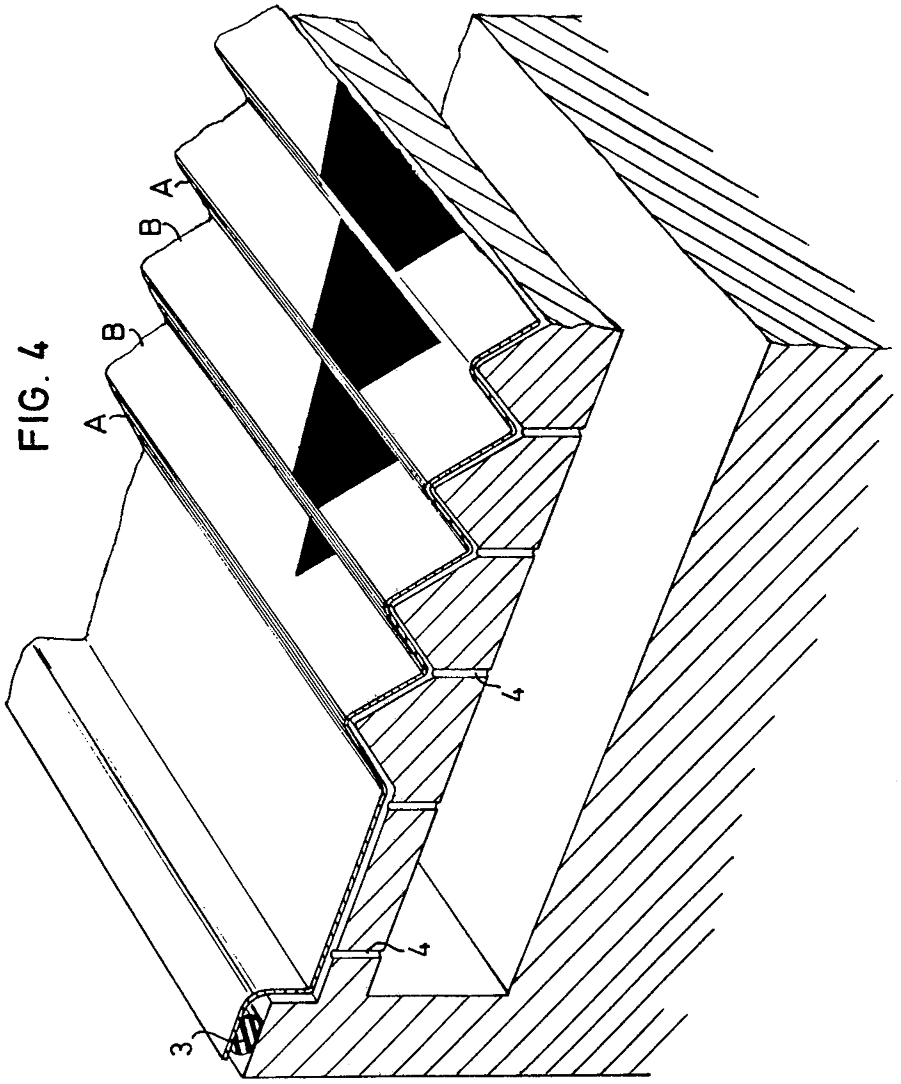
FIG. 4 shows the mold as illustrated in FIG. 3 but seen from another viewing angle.

After printing, the sheet is allowed to dry in the customary manner, and is subsequently placed in the mold which is to give it its final form. FIG. 2 shows an example of such a mold. The said short and long sides of the sheet, used for location during printing, are also located against suitable stop means (not shown) in the mold. The sheets will thus be so located in relation to the ridge peaks of the mold that they will come directly below (or above) the boundary lines between different image strips, and so that there are two adjacent strips between each pair of ridges. After the sheet has thus been placed against the plate 1, the pivotable frame 2 is lowered, the sheet then abutting sealingly against sealing beads 3. The mold is inserted in an oven intended for the purpose, where the sheet softens. The mold with the deformed sheet is apparent in detail from FIGS. 3 and 4. In response to air pumped from the holes 4 (see FIGS. 3 and 4) the plastic sheet will rather accurately adjust itself to the valleys 11 and peaks 10 of the mold. FIGS. 3 and 4 show how the image strips A and B come on either side of the ridges. The mold is then removed from the oven and the sheet is stabilized in its configuration by cooling, preferably by blowing cool air on it, and it is thereafter taken from the mold. Successively manufactured sheets can be piled on top of one another, and although somewhat increased in thickness due to molding they will hardly be more voluminous than before.

In certain cases it is desirable to produce very long strips of the intended product. One way of obtaining such strips is by joining them, which is easily done since the corrugated configuration allows practically invisible joints to be formed. An elongated sign of this kind can easily be coiled to make it less voluminous or more convenient to handle.

In a preferred embodiment, and with the mold shown in FIG. 2, the ready-molded sheet has flat surfaces 5 at the edges, apart from the corrugated surface in the center. It will be clear that such a configuration increases the stiffness of the plastic sheet, which is an advantage in many cases. If, as shown in the figure, the flat surfaces contrast against raised ridges, the plastic sheet can be backed, e.g., with thick paper or cardboard, the sign thus being very easy to handle and affix.

In the drawings the ridges 10 are shown with cross-sections corresponding to equilateral triangles. The angle between the perpendiculars to the images will thus be 120°, which is generally suitable and gives a good effect. However, other angles can be selected, and this can result in difficulties in getting the sheet of plastic to assume sufficient deformation. For such reasons, another shape of the peaks and valleys may be desired. It may also be desired to arrange three instead of two images, the elements for the third image being on a flat surface between the sides of the ridges. In the latter case it is suitable to arrange the ridges at a greater distance from each ther, making their peak angle as small as possible with respect to the deformability of the plastic, and leaving between the ridges flat surfaces of approximately the same size as the sides of the ridges. Dimensioning in such cases must be determined with respect to the deformability of the plastic, this also being applicable to the registry spacing between the respective strip widths of the three images.

It will be apparent from the above description that the plastic sheet is moulded while retaining the distance between the points in the solely printed sheet, located at the ridge peaks, while the plastic is adjusted to the valleys with respect to its deformation elongation. This places certain definite demands on the plastic, not difficult to meet per se by a suitable choice when one skilled in the art making the choice is observant of this problem. If an unsuitable plastic is selected there may be a sideways deformation, so that the wrong image at the ridge peaks at the outer portions of the images is drawn up and over, confusing the visual impression.

On the other hand, it may be desirable for one image to be slightly drawn over the ridge peak, so that in viewing from one side, one image is completely visible while the other, although not properly visible, can already be devined. Such modifications are possible for one skilled in the art.

What I claim is:

1. In a method of manufacturing signs or the like carrying displays which are different for different viewing angles, and of the kind which has the configuration of a plurality of parallel ridges with intermediate valleys, a said display being divided into strip-like portions applied in sequence to one side of said ridges, whereby, upon observation obliquely from said one side they appear substantially as an uninterrupted display, while strip-like portions of another display are applied to the other side of said ridges, the steps of (a) dividing each of two images into parallel strips of predetermined and equal widths;

(b) composing a third image by placing said parallel strips from both first-mentioned images side by side in alternating sequence;

(c) reproducing said third image on a plastic sheet;

(d) placing said plastic sheet, provided with said third image, in a mold formed with parallel ridges and intermediate valleys corresponding to said configuration of the finished product, the distance between successive ridge peaks being twice as large as said predetermined width of said strips;

(e) locating said sheet so that each ridge peak in said mold is substantially opposite the boundary line between two strips in said third image;

(f) heat deforming said sheet against the surface of said mold, while points lying against the ridge peaks remain undisplaced, the zones between said peaks being deformed so that they are brought into substantive engagement with the valleys between the ridges.

2. A method as claimed in claim 1, wherein said third image is reproduced by silk screen printing.

3. A method as claimed in claim 1, wherein said sheet is subjected to deformation elongation by vacuum means arranged in holes disposed between said ridges.

4. A method as claimed in claim 1 or 3, wherein said ridges are arranged in said mold so that they project from a plane, a flat surface margin being provided on said sheet.

5. A method as claimed in claim 4, wherein said margin surrounds the area of said sheet provided with said ridges and valleys.

* * * * *